United States Patent
Ratliff et al.

(10) Patent No.: US 6,181,530 B1
(45) Date of Patent: Jan. 30, 2001

(54) HEAT SINK FOR A VOICE COIL MOTOR

(75) Inventors: Ryan T. Ratliff; Steve S. Eckerd, both of Oklahoma City, OK (US)

(73) Assignee: Seagate Technology LLC, Scotts Valley, CA (US)

( * ) Notice: Under 35 U.S.C. 154(b), the term of this patent shall be extended for 0 days.

(21) Appl. No.: 09/191,507

(22) Filed: Nov. 13, 1998

Related U.S. Application Data

(60) Provisional application No. 60/094,885, filed on Jul. 31, 1998.

(51) Int. Cl.[7] .............................. G11B 33/14; H02K 33/18
(52) U.S. Cl. .................................... 360/265.8; 360/264.7; 360/97.02
(58) Field of Search ................... 360/97.02, 105, 360/106, 97.01, 98.01, 264.7, 265.7, 265.8

(56) References Cited

U.S. PATENT DOCUMENTS

| | | | |
|---|---|---|---|
| 4,775,908 | * 10/1988 | Ycas | 360/106 |
| 5,247,410 | * 9/1993 | Ebihara et al. | 360/106 |
| 5,262,907 | 11/1993 | Duffy et al. | 360/77.05 |
| 5,404,258 | 4/1995 | Arin et al. | 360/106 |
| 5,517,372 | 5/1996 | Shibuya et al. | 360/97.02 |
| 5,585,981 | 12/1996 | Lee | 360/106 |
| 5,621,591 | 4/1997 | Rahimi et al. | 360/106 |
| 5,666,052 | * 9/1997 | Sata | 324/248 |
| 5,673,013 | * 9/1997 | Moody et al. | 336/192 |
| 5,768,050 | 6/1998 | Cho | 360/97.02 |
| 5,894,524 | * 4/1999 | Kotsatos et al. | 381/397 |
| 5,985,684 | * 11/1999 | Marshall et al. | 438/26 |

* cited by examiner

Primary Examiner—Jefferson Evans
(74) Attorney, Agent, or Firm—Crowe & Dunlevy

(57) ABSTRACT

A bobbin for providing a heat sink for an actuator coil of a voice coil motor, the actuator coil having a plurality of windings arranged about a central aperture, the bobbin having a body member supported within the central aperture of the actuator coil. The body member has a plurality of fins which increase the surface area within the actuator coil to provide enhanced heat dissipation. The bobbin is formed from a thermally conductive, dielectric material to facilitate the dissipation of heat generated in response to the application of current to the actuator coil to reduce the operational temperature thereof while preventing detrimental eddy currents, thereby allowing an increased current flow to effectuate a decrease in seek time.

8 Claims, 2 Drawing Sheets

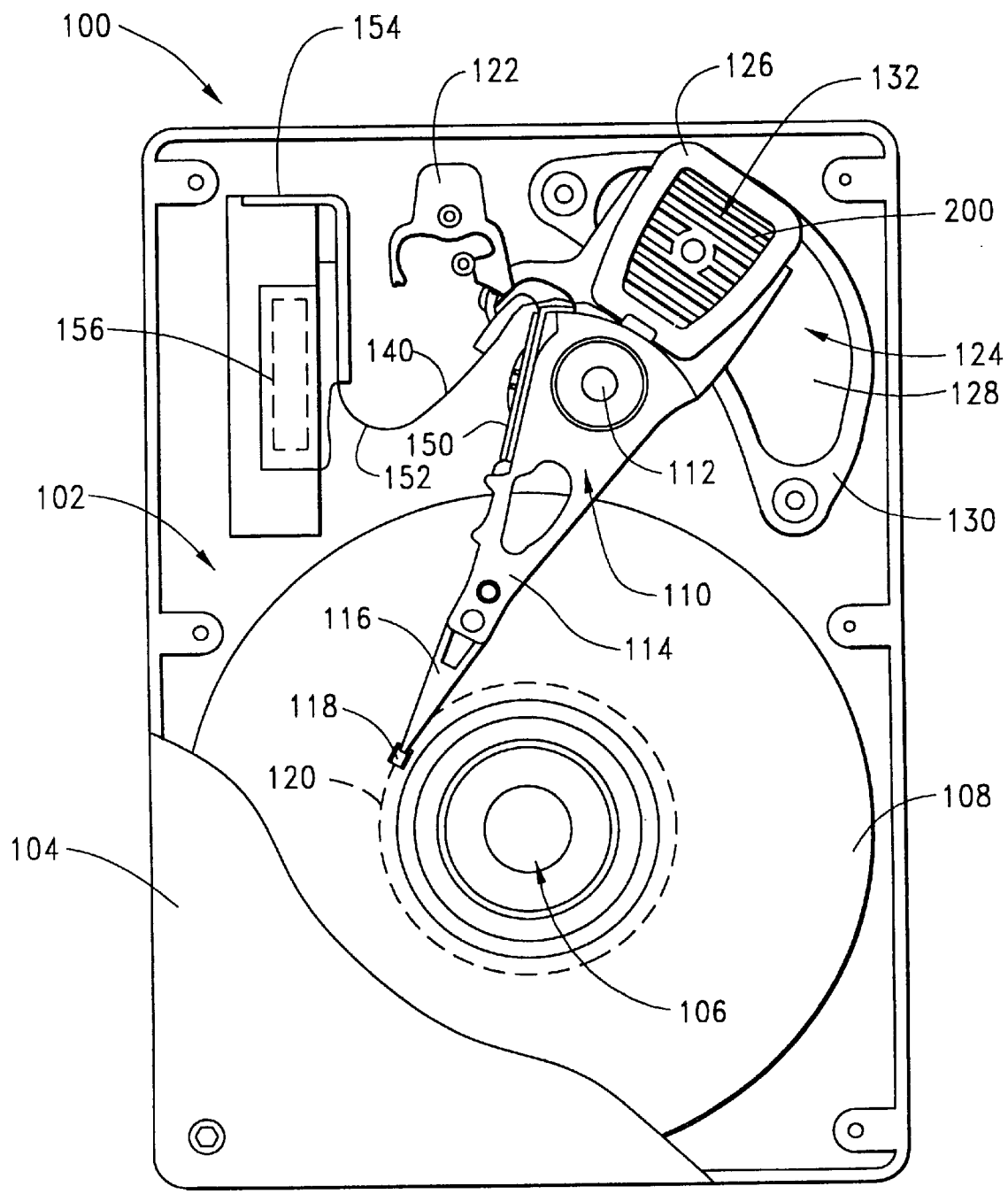

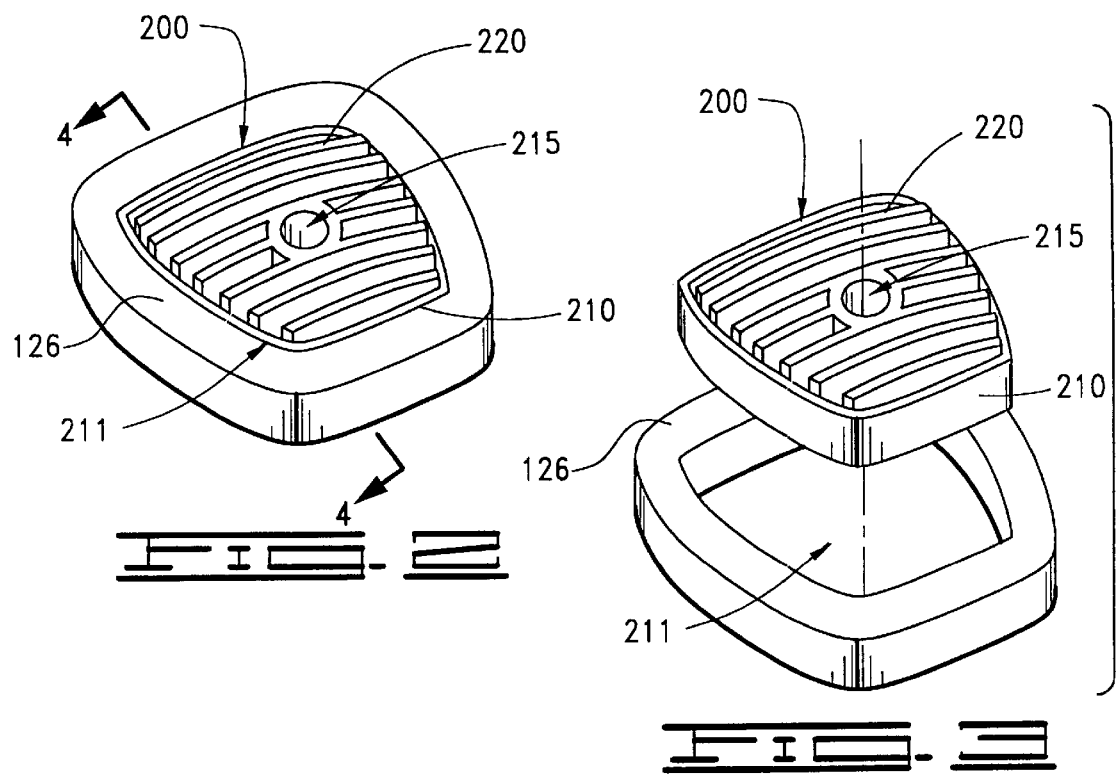
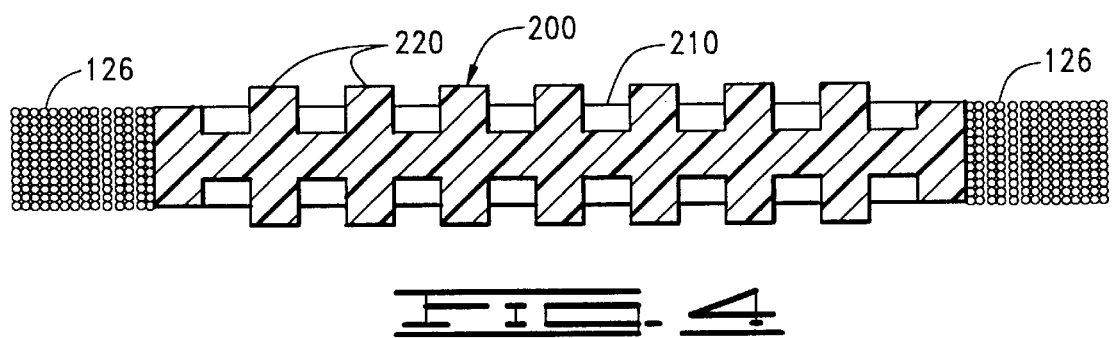
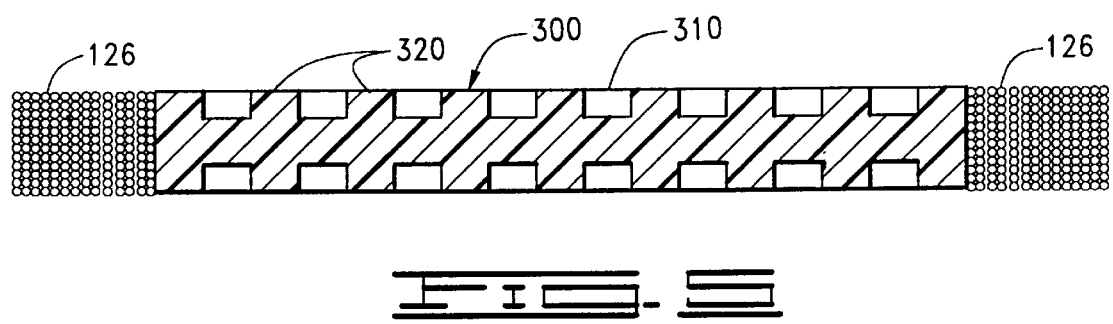

HEAT SINK FOR A VOICE COIL MOTOR

RELATED APPLICATIONS

This application claims the benefit of United States Provisional Application No. 60/094,885 entitled BOBBIN HEAT SINK, filed Jul. 31, 1998.

FIELD OF THE INVENTION

The present invention relates generally to the field of disc drive devices, and more particularly but without limitation, to a heat sink for a disc drive voice coil motor to improve the operational performance of the disc drive.

BACKGROUND OF THE INVENTION

Modern hard disc drives comprise one or more rigid discs that are coated with a magnetizable medium and mounted on the hub of a spindle motor for rotation at a constant high speed. Information is stored on the discs in a plurality of concentric circular tracks by an array of transducers ("heads") mounted to a controllably positionable actuator for radial movement relative to the discs.

Typically, such radial actuators employ a voice coil motor to position the heads with respect to the disc surfaces. The heads are mounted via flexures at the ends of a plurality of arms which project outward from an actuator body. The actuator body pivots about a cartridge bearing assembly mounted to the disc drive housing at a position closely adjacent the outer extreme of the discs so that the heads move in a plane parallel with the surfaces of the discs.

The voice coil motor includes a coil mounted radially outward from the cartridge bearing assembly, the coil being immersed in the magnetic field of a magnetic circuit of the voice coil motor. The magnetic circuit comprises one or more permanent magnets and magnetically permeable pole pieces. When current is passed through the coil, an electromagnetic field is established which interacts with the magnetic field of the magnetic circuit so that the coil moves in accordance with the well-known Lorentz relationship. As the coil moves, the actuator body pivots about the pivot shaft and the heads move across the disc surfaces.

A closed loop digital servo system such as disclosed in U.S. Pat. No. 5,262,907 issued Nov. 16, 1993 to Duffy et al., assigned to the assignee of the present invention, is typically utilized to maintain the position of the heads with respect to the tracks. Such a servo system obtains head position information from servo blocks written to the tracks during disc drive manufacturing to maintain a selected head over an associated track during a track following mode of operation. A seek mode of operation, which comprises the initial acceleration of a head away from an initial track and the subsequent deceleration of the head towards a destination track, is also controlled by the servo system. Such seek operations are typically velocity controlled, in that the velocity of the head is repetitively measured and compared to a velocity profile, with the current applied to the coil being generally proportional to the difference between the actual and profile velocities as the head is moved toward the destination track.

A continuing trend in the industry is to provide disc drives with ever increasing data storage and transfer capabilities, which in turn has led to efforts to minimize the overall time required to perform a disc drive seek operation. A typical seek operation includes an initial overhead time during which the disc drive services its own internal operations, a seek time during which the head is moved to and settled on the destination track, and a latency time during which the drive waits until a particular sector on the destination track reaches the head as the discs rotate relative to the heads.

Seek times have typically been minimized through the application of relatively large amounts of current to the coil during the acceleration and deceleration phases of a seek operation. One way of reducing seek time is to increase the relative amount of current to the electric coil. However, as the current is increased the operating temperature of the coil likewise increases, as a proportionate amount of the electrical energy is dissipated as heat energy. One skilled in the art will understand that the amount of current that can be passed through a coil is generally a function of its electrical resistance, which is directly affected by the temperature of the coil. As the temperature of the coil increases, the resistance of the coil increases, and the magnitude of the control current is limited, thereby adversely affecting the drive seek time. Moreover, elevated coil temperatures can also adversely affect the seek time performance by generally weakening the strength of the magnetic circuit of the magnet assembly.

Additionally, elevated voice coil motor temperatures can result in the degradation of adhesive and insulative materials used in the construction of the voice coil motor. Such degradation can lead to internal contamination of the disc drive as well as to the shorting of the coil.

Efforts have been made to reduce such temperature increases by using external means to cool the voice coil motor. For example, U.S. Pat. No. 5,517,372 issued May 14, 1996 to Shibuya et al., discloses a means for diverting the air flowing over the discs to flow over the voice coil motor. However, such cooling efforts increase power consumption by creating increased drag upon the discs. Such methods in essence add to the complexity of the drive through the addition of extraneous items such as ducts or diverters.

There is a continuing need in the industry for an improved actuator assembly with enhanced heat dissipation to facilitate cooling of the actuator coil without hindering the overall performance of the disc drive.

SUMMARY OF THE INVENTION

The present invention provides a heat sink for reducing the temperature of a voice coil motor during disc drive operation. Generally, in accordance with the preferred embodiments of the present invention, an improved heat sink is disposed within an aperture of an actuator coil to dissipate heat that accumulates therein.

In accordance with a first preferred embodiment, a bobbin formed from a thermally conductive, dielectric material serves as a heat sink for an actuator coil and facilitates the dissipation of heat that is generated in response to the application of current to the actuator coil, thereby reducing the operational temperature of the coil. Fins arranged in a substantially parallel formation on the bobbin provide increased surface area within the actuator coil to enhance heat dissipation thereof.

During operation, the bobbin conducts heat that accumulates at the actuator coil, thereby providing continuous cooling for the actuator coil. By cooling the actuator coil during operation, the electrical resistance is effectively reduced, thereby allowing a larger control current to be applied to the actuator coil to increase the speed of seek performance. The thermal conductivity of the material of the bobbin enhances heat dissipation while the dielectric nature of the bobbin prevents the formation of detrimental eddy currents around the actuator coil that can impede smooth current flow.

Reducing the operating temperature of the voice coil motor also lessens the temperature degradation of the magnetic circuit strength. Other advantages and features of the present invention will be apparent from the following description when read in conjunction with the drawings and appended claims.

BRIEF DESCRIPTION OF THE DRAWINGS

FIG. 1 is a partially cut away top plan view of a disc drive including a bobbin heat sink constructed in accordance with a first preferred embodiment of the present invention.

FIG. 2 is an isometric view of the actuator coil and bobbin of the disc drive of FIG. 1.

FIG. 3 is an isometric, exploded view of the actuator coil and bobbin of FIG. 2.

FIG. 4 is a cross-sectional, elevational view taken at 4—4 in FIG. 1.

FIG. 5 is a cross-sectional, elevational view similar to FIG. 4 of an actuator coil and bobbin constructed in a second preferred embodiment of the present invention.

DETAILED DESCRIPTION

Referring to the drawings in general, and more particularly to FIG. 1, shown therein is a plan view of a typical prior art disc drive 100 in which the present invention is especially useful. It will be understood that a variety of alternative preferred embodiments for the disc drive 100 will be discussed below in turn and that several of the features disclosed may be readily combined as desired, depending upon the requirements of a given application. Accordingly, for purposes of clarity the reference numeral 100 will be used throughout to identify the top level disc drive assembly for each of the disclosed embodiments.

The disc drive 100 includes a base deck 102 to which various components of the disc drive 100 are mounted. A top cover 104 (shown in partial cutaway fashion) cooperates with the base deck 102 in a known manner to form a sealed internal environment for the disc drive.

A spindle motor 106 rotates one or more discs 108 at a constant high speed. Information is written to and read from tracks (not designated) on the discs 108 through the use of an actuator assembly 110, which rotates about a cartridge bearing assembly 112 positioned adjacent the discs 108.

The actuator assembly 110 includes a plurality of actuator arms 114 which extend toward the discs 108, with one or more flexures 116 extending from each of the actuator arms 114. Mounted at the distal end of each of the flexures 116 is a head 118 which includes a slider assembly (not separately designated) having associated aerodynamic characteristics to enable the head 118 to fly in close proximity to the corresponding surface of the associated disc 108.

At such time that the disc drive 100 is not in use, the heads 118 are moved over landing zones 120 near the inner diameter of the discs 108. The heads 118 are secured over the landing zones 120 through the use of a conventional latch arrangement, such as designated at 122, which prevents inadvertent rotation of the actuator assembly 110 when the heads are parked.

The radial position of the heads 118 is controlled through the use of a voice coil motor (VCM) 124, which typically includes an actuator coil 126 attached to the actuator assembly 110, as well as one or more permanent magnets 128 and corresponding magnetically permeable pole pieces 130 which establish a magnetic field in which the actuator coil 126 is immersed. Thus, the controlled application of current to the actuator coil 126 causes magnetic interaction between the magnetic field of the VCM 124 and electromagnetic fields induced in the actuator coil 126 so that the actuator coil 126 moves in accordance with the well known Lorentz relationship. As the actuator coil 126 moves, the actuator assembly 110 pivots about the cartridge bearing assembly 112 and the heads 118 are caused to move across the surfaces of the discs 108. The actuator coil 126 comprises a plurality of windings arranged about a central aperture 132 therein.

A flex assembly 140 provides the requisite electrical connection paths for the actuator assembly 110 while facilitating pivotal movement of the actuator assembly 110 during operation. The flex assembly includes a printed circuit board 150 (hereinafter also referred to as "PCB" or "board") to which head wires (not shown) are connected, the head wires being routed along the actuator arms 114 and the flexures 116 to the heads 118. The board 150 includes circuitry for controlling the write currents applied to the heads 118 during write operation and for amplifying read signals generated by the heads 118 during read operation. As shown in FIG. 1, the flex assembly further includes a flex writing strip 152 to which the board 150 is affixed, the flex writing strip 152 comprising a laminated plastic ribbon having encapsulated signal paths. The flex writing strip 152 mechanically terminates at a termination bracket 154 that mechanically secures the flex writing strip 152 relative to the base deck 102 in a conventional manner.

Of particular interest in FIG. 1 is a bobbin 200 that is constructed in accordance with a first preferred embodiment of the present invention. Unlike prior art disc drives wherein the actuator coil comprises a plurality of windings arranged about a central aperture, the actuator coil 126 is wound around the bobbin 200 such that the bobbin 200 encloses the central aperture 132 created by the wound actuator coil 126. The bobbin 200 serves as a heat sink for dissipating heat that accumulates at the actuator coil during operation.

Referring to FIG. 2, shown therein is an isometric view of the actuator coil 126 and bobbin 200. More particularly, FIG. 2 shows the bobbin 200 comprising a body member 210 disposed within the central aperture 132, a positioning aperture 215 disposed within a symmetrical center of the bobbin 200, and a plurality of fins 220. The body member 210 of the bobbin 200 provides an internal frame for winding the actuator coil 126 about the body member 210. The positioning aperture 215 is provided as a locating hole to facilitate alignment of the bobbin 200 within the disc drive 100 during assembly.

The fins 220 are arranged in a consecutive, substantially parallel configuration and are oriented such that they move along the path of the actuator coil 126 to provide increased surface area within the central aperture of the actuator coil 126, thereby enhancing the heat dissipation is enhanced thereof. The fins 220 extend beyond the actuator coil 126, the extension of the fins 220 effectuating the entrapment of air flowing across the actuator coil 126 such that the heat dissipation capability of the bobbin 200 are enhanced.

Turning to FIG. 3, shown therein is an isometric, exploded view of the actuator coil 126 and bobbin 200 of FIG. 1. It should be understood that the exploded view is used merely to illustrate that the bobbin 200 is sized to accommodate and receive the actuator coil 126 such that the bobbin 200 encloses the central aperture 132 of the actuator coil 126. While the invention of FIG. 3 should be understood to illustrate the bobbin 200 inserted within the central aperture of the actuator coil 126, the actuator coil 126 is preferably formed by winding the coil about the body member 210 of the bobbin 200.

Referring to FIG. 4, shown therein is a cross-sectional, elevational view of the bobbin 200 of FIG. 1. In particular, the fins 220 of the bobbin 200 are shown in a first preferred embodiment whereby the fins 220 are arranged in a consecutive, parallel configuration such that they move parallel to the movement of the actuator coil 126. Furthermore, the fins 220 extend beyond the extent of the actuator coil 126 in a direction perpendicular to the actuator coil 126. The fins 220 as shown in FIG. 4 effectuate the air traveling across the actuator coil 126, such that the capabilities of the bobbin 200 as a heat sink are enhanced by air cooling thereof.

The bobbin 200 acts as a heat sink and is formed from a thermally conductive, dielectric material to facilitate the dissipation of heat generated in response to the application of current to the actuator coil 126 such that the operational temperature therein is reduced. In particular, in an effort to reduce seek time, a relatively large amount of current can be applied to the actuator coil 126. However, as the current is increased, the operating temperature of the actuator coil 126 likewise increases since a proportionate amount of the electrical energy is dissipated as heat energy. The amount of current that can be passed through the actuator coil 126 is generally a function of its electrical resistance, which is directly affected by the temperature of the actuator coil 126. Therefore, as the temperature of the actuator coil 126 increases, the resistance of the actuator coil 126 increases, and the magnitude of the control current is limited, thereby adversely affecting seek time of the disc drive 100. The thermal conductivity of the bobbin 200 provides increased heat dissipation from the actuator coil 126 to reduce the increase in electrical resistance to allow for an increased application of current to the actuator coil 126. Moreover, the dielectric nature of the bobbin 200 substantially prevents eddy currents from occurring that can impede the performance of the actuator coil. The bobbin 200 is constructed of the material boron nitride in a preferred embodiment with a thermal conductivity of at least 381.7 Btu-in/hr.ft.$^2$ F and a dielectric strength of at least 1340 Volts/Mil.

Turning to FIG. 5, shown therein is a cross-sectional elevational view similar to FIG. 4 of an actuator coil and bobbin constructed in a second preferred embodiment of the present invention. More particularly, FIG. 5 shows a bobbin 300 comprising a body member 310 and a plurality of fins 320, the body member 310 providing an internal frame for winding the actuator coil 126 about the body member 310.

The fins 320 extend within the limits of the central aperture 132 of the actuator coil 126 such that the actuator coil 126 completely encompasses the bobbin 200. The fins 320 thereby provide increased surface area within the central aperture 132 of the actuator coil 126 to enhance heat dissipation therein without encroaching upon the limited space within the disc drive 100.

Accordingly, in view of the foregoing it will be recognized that the present invention provides an apparatus for providing a heat sink for a VCM (such as 120) of a disc drive (such as 100) through a bobbin (such as 200) sized for receiving an actuator coil (such as 126). The bobbin (such as 200) is formed from a thermally conductive, dielectric material such as boron nitride to provide enhanced heat dissipation capabilities, thereby reducing the operational temperature of the actuator coil (such as 126) while allowing for a decrease in seek time.

A bobbin (such as 200) can further comprise a body member (such as 210) including a plurality of fins (such as 220) to provide more surface area within the actuator coil (such as 126) such that the heat dissipation therein is enhanced. It will be understood that the bobbin 200 can be constructed without such fins 220 and if provided, the size and number of the fins 220 can vary depending upon the requirements of a given application.

It is clear that the present invention is well adapted to attain the ends and advantages mentioned as well as those inherent therein. While a presently preferred embodiment of the invention has been described for purposes of the disclosure, it will be understood that numerous changes may be made which will readily suggest themselves to those skilled in the art and which are encompassed within the spirit of the invention disclosed and as defined in the appended claims

What is claimed is:

1. A disc drive comprising:
   a head which transfers data between a disc and a host device;
   an actuator coil of a voice coil motor which moves the head across a surface of the disc in response to the application of current to the actuator coil, the actuator coil comprising a plurality of windings arranged about a central aperture; and
   a bobbin sized for receiving the plurality of windings while enclosing the central aperture of the actuator coil, the bobbin comprising a thermally conductive, electrically dielectric material such that the bobbin serves as a heat sink for dissipating heat generated in response to application of current to the actuator coil.

2. The disc drive of claim 1 wherein the bobbin further comprises a body member supported by the actuator coil and disposed within the central aperture within the actuator coil.

3. The disc drive of claim 2 wherein the body member further comprises a plurality of fins disposed therein, the fins enhancing convective cooling of the body member.

4. The disc drive of claim 2 wherein the body member has a positioning aperture disposed within a symmetrical center of the bobbin.

5. The disc drive of claim 1 wherein the thermally conductive, electrically dielectric material is boron nitride.

6. The disc drive of claim 1 wherein the thermally conductive, electrically dielectric material has a thermal conductivity of at least 381.7 Btu-in/hr. ft.$^2$ F.

7. The disc drive of claim 1 wherein the thermally conductive, electrically dielectric material has a dielectric strength of at least 1340 Volts/Mil.

8. A disc drive comprising:
   a head which transfers data between a disc and a host device;
   an actuator coil of a voice coil motor which moves the head across a surface of the disc in response to the application of current to the actuator coil, the actuator coil comprising a plurality of windings arranged about a central aperture; and
   means for providing a heat sink for the actuator coil to reduce heat generated in response to application of current to the actuator coil such that operational temperature of the actuator coil is reduced.

* * * * *